United States Patent
Tsai et al.

(10) Patent No.: US 7,268,515 B1
(45) Date of Patent: Sep. 11, 2007

(54) THREE-IN-ONE AC SERVO DRIVE

(75) Inventors: Ching-Hsiung Tsai, Taoyuan Hsien (TW); Jian-Da Chen, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 11/425,319

(22) Filed: Jun. 20, 2006

(51) Int. Cl.
*H02P 27/04* (2006.01)

(52) U.S. Cl. ............... 318/801; 318/721; 318/800; 700/601

(58) Field of Classification Search ........... 318/721, 318/801, 808, 800; 700/61
See application file for complete search history.

(56) References Cited

U.S. PATENT DOCUMENTS

| | | | |
|---|---|---|---|
| 5,903,128 A * | 5/1999 | Sakakibara et al. ......... 318/721 |
| 6,194,856 B1 * | 2/2001 | Kobayashi et al. ......... 318/432 |
| 6,400,127 B1 * | 6/2002 | Giannopoulos ............. 323/283 |
| 6,653,812 B1 * | 11/2003 | Huo et al. ................... 318/801 |
| 7,010,438 B2 * | 3/2006 | Hancock et al. .............. 702/60 |
| 7,042,175 B2 * | 5/2006 | Watanabe ..................... 318/34 |
| 7,135,827 B1 * | 11/2006 | Lampson .................... 318/135 |
| 7,138,934 B2 * | 11/2006 | Melanson ................... 341/143 |
| 2005/0077847 A1* | 4/2005 | Watanabe ..................... 318/34 |
| 2005/0237083 A1* | 10/2005 | Bakker et al. ................ 326/47 |
| 2006/0100723 A1* | 5/2006 | Sun et al. ..................... 700/61 |

* cited by examiner

Primary Examiner—Paul Ip

(57) ABSTRACT

A three-in-one AC servo drive includes a main console, a control module, a power module and a plurality of servo motors. A single drive can be connected to a plurality of motors. The power module and control module for the motors can be integrated to a single modular unit. Therefore, the redundant portion such as communication interface, display unit and I/O unit can be eliminated. The capacitor of the bus of the IGBT module can also be reduced, whereby the occupied space and cost can be reduced with less assembling time.

6 Claims, 1 Drawing Sheet

US 7,268,515 B1

THREE-IN-ONE AC SERVO DRIVE

BACKGROUND OF THE INVENTION

1. Field of the Invention

The present invention relates to an AC servo drive, especially to a three-in-one AC servo drive.

2. Description of Prior Art

The current multi-axes control system is a centralized system with a main console. The main console controls servo drive to control linear/circular interpolation movement of servo motors through conventional wiring or high speed communication.

The AC servo motor is generally used for machine with more than three axes or multi-axes system. The AC servo motor is designed to have a servo drive connected to a motor, or a servo drive connected to a plurality of motors in a one-to-many design. The later is an expandable modularized design wherein the power units for the motors are expanded when more motors are to be connected. However, the wiring and assembling time do not gain advantage in efficiency and cost down.

SUMMARY OF THE INVENTION

The present invention is to provide a three-in-one AC servo drive, where on drive is connected to a plurality of motors and the power modules and control modules for the motors are integrated in the same module. The redundant portions such as communication interfaces, display units, I/O units, capacitors of IGBT module of the power module can be saved, whereby the occupied space and cost can be reduced with less assembling time.

Accordingly, the present invention provides a three-in-one AC servo drive comprising a main console, a control module, a power module and a plurality of servo motors. The control module comprises:

a communication interface transmitting bi-directional command and data with the main console;

an I/O unit transmitting bi-directional analog/digital I/O signals;

a current detector used to receive current signals corresponding servo motors and converting the current signals to digital current signals;

an FPGA used to detect rotational position and rotational speed of the servo motors and outputting digital signals of rotational position and rotational speed, the FPGA generating PWM signals corresponding to current of servo motors;

a digital signal processor (DSP) receiving speed command, position command and torque command from the main console through the communication interface, receiving the analog/digital I/O signals from the I/O unit, receiving the digital current signal from the current detector and receiving the digital signals of rotational position and digital signals of rotational speed from the FPGA, the digital signal processor (DSP) obtaining a PWM signal for current of the servo motor based on those signals, the digital signal processor (DSP) outputting the PWM signal to the FPGA and sending operation status of the servo motor to the main console; and the power module comprising:

a converter to convert AC power to DC power;

a power bus providing DC power to the converter;

a capacitor for stabilizing DC power for the power bus;

a plurality of inverters converting DC power of the power bus to AC power and generating AC voltage and AC current for corresponding servo motor according to PWM signal of the FPGA; and a plurality of current sensors for sensing current supplied from the inverter to the servo motors and outputting sensed current signal to the current detector.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
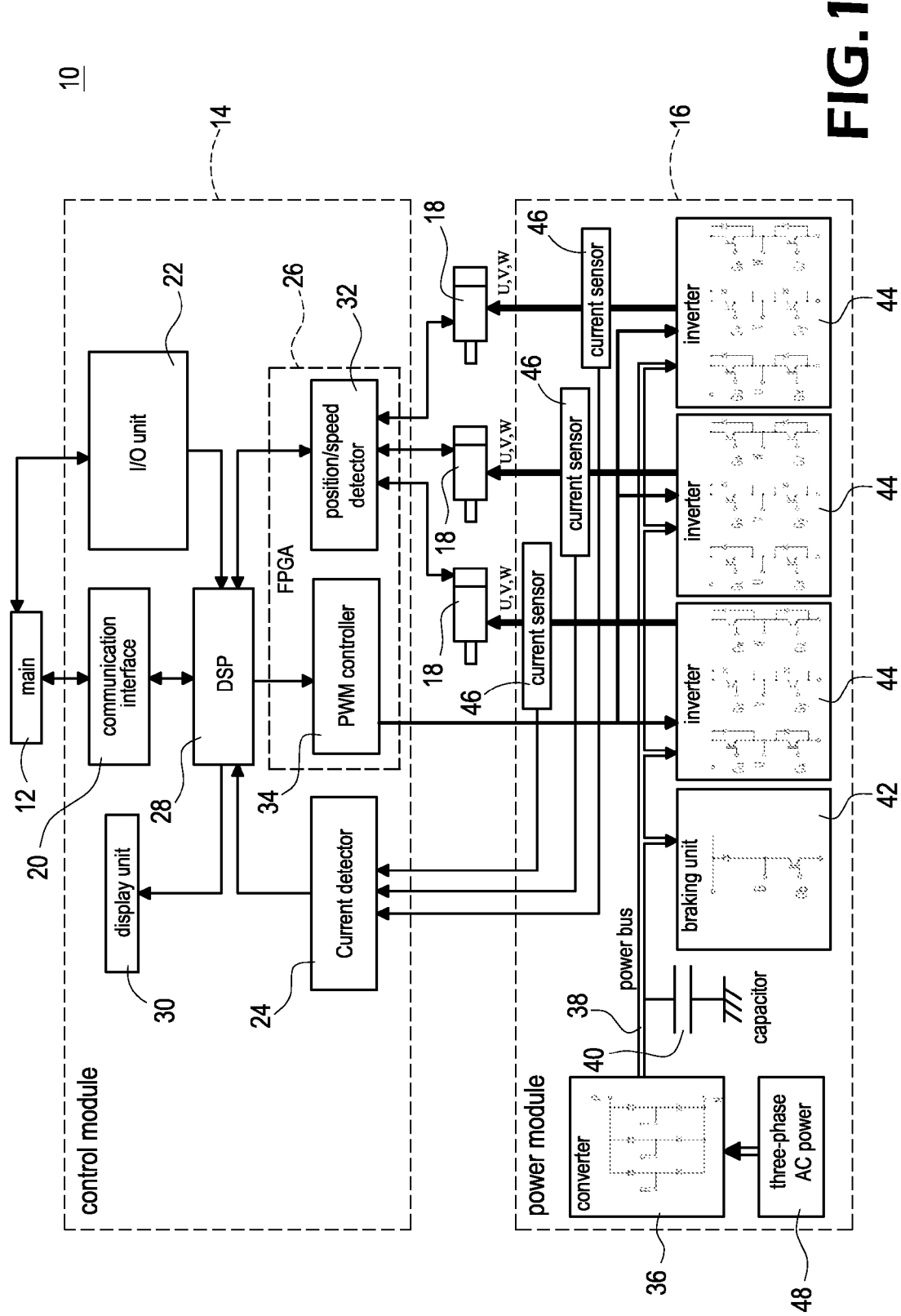
FIG. 1 shows the block diagram of the three-in-one AC servo drive according to the present invention.

FIG. 1 shows the block diagram of the three-in-one AC servo drive according to the present invention. The three-in-one AC servo drive 10 comprises a main console 12, a control module 14, a power module 16 and a plurality of servo motors 18.

The main console 12 comprises a communication interface 20, an I/O unit 22, a current detector 24, a field programmable gate array (FPGA) 26, a digital signal processor (DSP) 28 and a display unit 30. The FPGA 26 comprises a position/speed detector 32 and a phase width modulation (PWM) controller 34.

The power module 16 comprises a converter 36, a power bus 38, a capacitor 40, a braking unit 42, a plurality of inverters 44 and a plurality of current sensors 46.

The communication interface 20 and the main console 12 transmit command and data bi-directionally. For example, the main console 12 sends speed command, position command and torque command to the communication interface 20. The communication interface 20 sends the operation status of the servo motors 18 output from the digital signal processor (DSP) 28. The communication interface 20 comprises RS-485, an RS232, an Modbus and a CAN-open.

The I/O unit 22 and the main console 12 transmit digital/analog I/O signals bi-directionally. The I/O unit 22 has analog to digital conversion function or digital to analog conversion function, and digital input/output (DI/DO) function.

The current detector 24 receives a plurality of current signals corresponding to the servo motors 18 and converts the current signals to digital current signals for outputting to the digital signal processor (DSP) 28. The current sensor 46 senses the current supplied from the inverter 44 to the servo motor and sends the sensed current to the current detector 24.

The position/speed detector 32 of the FPGA 26 detects the rotational position and speed of the servo motors 18, and then sends digital signals of rotational position and digital signals of speed to the digital signal processor (DSP) 28. The phase width modulation (PWM) controller 34 of the FPGA 26 generates PWM signals corresponding to the current of the servo motor 18 according to the PWM signal of the digital signal processor (DSP) 28.

The digital signal processor (DSP) 28 receives speed command, position command and torque command from the main console 12 through the communication interface 20, receives the analog/digital I/O signals from the I/O unit 22, receives the digital current signal from the current detector 24 and receives the digital signals of rotational position and digital signals of rotational speed from the position/speed detector 32 of the FPGA 26. The digital signal processor (DSP) 28 obtains a PWM digital signal for current of the servo motor 18 based on those signal and high speed calculation thereof. The digital signal processor (DSP) 28 outputs the PWM digital signal to the phase width modulation (PWM) controller 34 of the FPGA 26. The digital signal processor (DSP) 28 sends the operation status of the servo motor 18 to the main console 12 through the communication interface 20.

The display unit 30 receives data from the digital signal processor (DSP) 28 and displays the voltage, current, position, speed and error message for each of the servo motors 19, wherein the display unit 30 can be a seven-segment display.

The converter 36 converts the three-phase power 48 into DC power. The power bus 38 provides DC power to the converter 36. The capacitor 40 is used to stabilize the DC power of the power bus 38 by reducing ripples of the power bus 38. The converter 36 can be bridge rectifier to convert the three-phase AC power 48 to DC power.

The inverter 44 converts the DC power of the power bus 38 into AC power and generates AC voltage and currents corresponding to the servo motors 18 according to the PWM signal from the phase width modulation (PWM) controller 34 of the FPGA 26. The inverter 44 is a full-bridge three-phase converter and converts DC power of the power bus 38 to three-phase AC voltage and current with varied frequency and varied amplitude. A six-bridge converter 44 with IGBT (Insulated Gate Bipolar Transistor) module uses a six-bridge switch to convert the DC power of the power bus to desired varied frequency and varied amplitude, where large DC voltage and current are converted to AC voltage and current. As can be seen in FIG. 1, the three sets of six-bridge converter 44 for the three-axes servo motors 18 uses the same DC voltage source. The six-bridge converter 44 releases the braking unit for the power bus 38 when the voltage of the power bus 38 is excessive. Therefore, the power module 16 can eliminate common portion in comparison with original one-by-one drive.

As can be seen from above description, the redundant elements such as braking unit 42, capacitor 40 and converter 36 can be eliminated by using voltage of common converter 36, power bus 38 and capacitor 36. The size of heat-dissipating plate (not shown) can also be reduced. The redundant elements such as display unit 30, communication interface 20 and I/O units 22 for the control module 14 can also be reduced. The hi-speed digital signal processor (DSP) 28 is more cost-effective then three DSPs. This will be more completive in cost in comparison with multi-axes system such as three-axes systems.

The present invention has the advantage of using one drive to connect a plurality of motors and the power modules of the motors can be placed in the same module. The motors can use the common drive portion such as communication interface, display unit, I/O units. The capacitor of the IGBT module of the power module can be reduced. The size will be more compact, the cost, wiring and assembling time can also be reduced.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A three-in-one AC servo drive comprising a main console, a control module, a power module and a plurality of servo motors, the control module comprising:
   a communication interface transmitting bi-directional command and data with the main console;
   an I/O unit transmitting bi-directional analog/digital I/O signals;
   a current detector used to receive current signals corresponding servo motors and converting the current signals to digital current signals;
   a field programmable gate array (FPGA) used to detect rotational position and rotational speed of the servo motors and outputting digital signals of rotational position and rotational speed, the FPGA generating phase width modulation (PWM) signals corresponding to current of servo motors;
   a digital signal processor (DSP) receiving speed command, position command and torque command from the main console through the communication interface, receiving the analog/digital I/O signals from the I/O unit, receiving the digital current signal from the current detector and receiving the digital signals of rotational position and digital signals of rotational speed from the FPGA, the digital signal processor (DSP) obtaining a PWM signal for current of the servo motor based on those signals, the digital signal processor (DSP) outputting the PWM signal to the FPGA and sending operation status of the servo motor to the main console; and
   the power module comprising:
   a converter to convert AC power to DC power;
   a power bus providing DC power to the converter;
   a capacitor for stabilizing DC power for the power bus;
   a plurality of inverters converting DC power of the power bus to AC power and generating AC voltage and AC current for corresponding servo motor according to PWM signal of the FPGA; and
   a plurality of current sensors for sensing current supplied from the inverter to the servo motors and outputting sensed current signal to the current detector
   wherein the power module further comprises a single braking unit connected to the power bus to release energy when the voltage of the power bus is excessive.

2. The three-in-one AC servo drive as in claim 1, wherein the transmission interface is one of RS-485, RS232, Modbus and CAN-open.

3. The three-in-one AC servo drive as in claim 1, wherein the control module further comprises a display for receiving data from the DSP and displaying voltage, current, position, speed and error message of each servo motor.

4. The three-in-one AC servo drive as in claim 1, wherein the FPGA comprises
   a position/speed detector for detecting rotational position and rotational speed of the servo motors and outputting digital signals for rotational position and rotational speed; and
   a PWM controller for generating PWM signal for current of the servo motor based on PWM signal of the PWM digital signal of the DSP.

5. The three-in-one AC servo drive as in claim 1, wherein the converter is a bridge rectifier to convert a three-phase AC power to a DC power, wherein the inverter is a full-bridge three-phase inverter to convert the DC power to three-phase voltage and current with varied frequency and varied amplitude.

6. The three-in-one AC servo drive as in claim 1, wherein the inverter is a six-bridge inverter with IGBT (Insulated Gate Bipolar Transistor) module uses a six-bridge switch to convert the DC power of the power bus to desired varied frequency and varied amplitude, and the six-bridge inverter releases the braking unit for the power bus when the voltage of the power bus is excessive.

* * * * *